April 25, 1972   F. H. ANCKER   3,658,978
CALENDERING OF POLYMERIC MATERIALS
Filed July 7, 1969   4 Sheets-Sheet 1
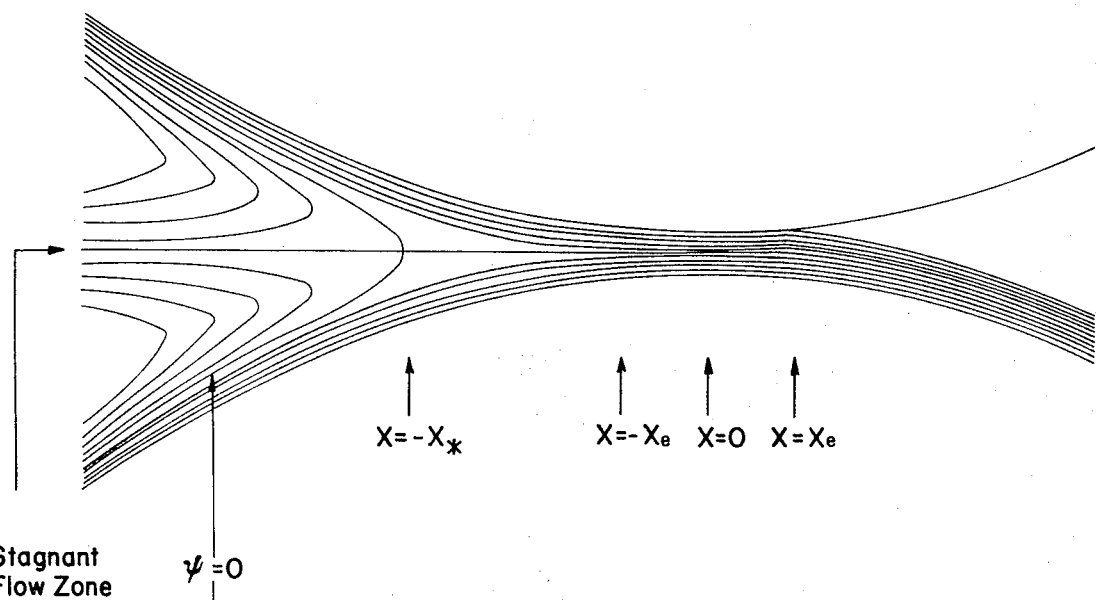
FIG. 1.
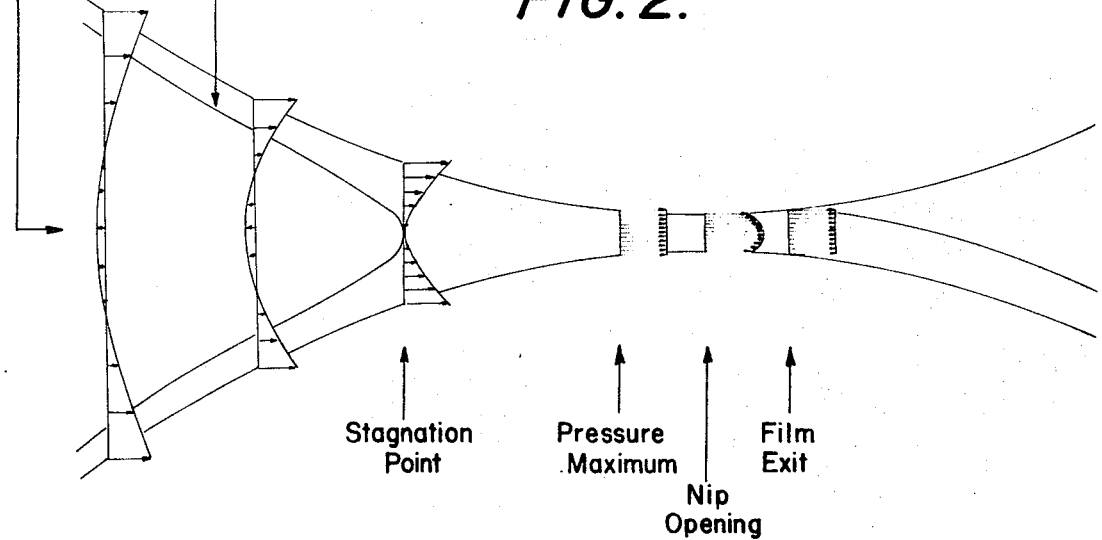
FIG. 2.
INVENTOR
FRED H. ANCKER
BY 
ATTORNEY

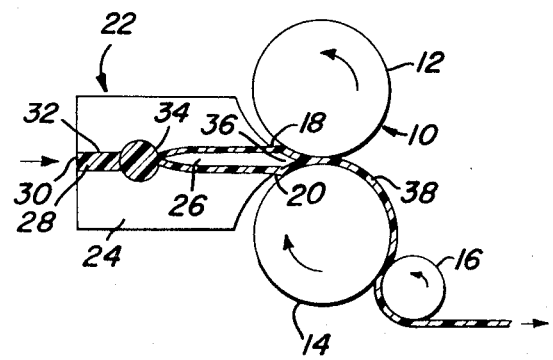
FIG. 5.
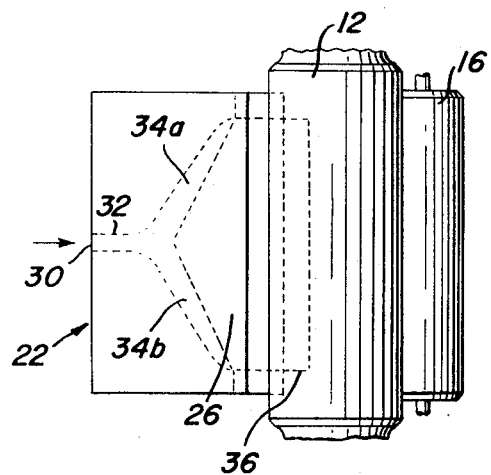
FIG. 6.
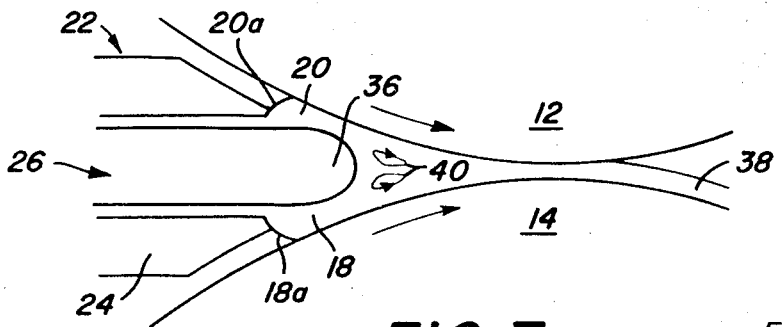
FIG. 7.

United States Patent Office 3,658,978
Patented Apr. 25, 1972

3,658,978
CALENDERING OF POLYMERIC MATERIALS
Fred H. Ancker, Warren, N.J., assignor to Union
Carbide Corporation, New York, N.Y.
Filed July 7, 1969, Ser. No. 839,292
Int. Cl. B29d 7/14
U.S. Cl. 264—175                                      10 Claims

ABSTRACT OF THE DISCLOSURE

Process and apparatus for the calendering of polymeric material comprising feeding said polymeric material thru the nip of a calender having a pair of counter-rotating rolls while maintaining a volumetric obstruction across the width and between the pair of calender rolls, the most downstream projection of said obstruction being positioned so as to at least penetrate the bank of material formed between the pair of calender rolls upstream of the nip by the selection of calendering conditions and while concurrently feeding a stream of polymeric material to said nip opening on each side of said volumetric obstruction.

---

The present invention relates to the calendering of polymeric materials and, more particularly, to method and apparatus for controlling the flow of such materials between a pair of counter-rotating calender rolls.

The calendering of polymeric materials is well known in the prior art. For a detailed discussion of the calendering process, reference is made to an article by F. H. Ancker entitled "Trends in Calendering," Plastics Technology, 14 #12, 50, 1968 and British Pat. No. 1,127,743 (or corresponding U.S. Pat. No. 3,499,957) and the references quoted therein. The conventional calendering process consists in shaping a molten or heat-softened polymeric material into film or sheeting by passage thru the nip opening of one or more pairs of counter-rotating rolls. Usually, three-roll passes (four rolls) are required, i.e., the calendering process is repeated three times over in order to obtain a sheet of satisfactory surface quality.

In recent years, there has been considerable interest in attempting to accomplish the calendering operation in a single-roll pass by feeding a two-roll calender directly from an extruder slot die. Unfortunately, such attempts have had very limited success, except in embossing or roll planishing where the rolls exert little or no thickness reduction of the hot extruded sheet, i.e., where the rolls actually do not shape or calender the material. In fact, even minor irregularities in the molten polymer stream on the inlet side of the roll nip generally lead to very pronounced surface defects in the sheet emerging from the roll nip. Accordingly, attempts to reduce the cost of current calendering equipment and simplify the calendering process have been largely unsuccessful.

However, even allowing for the very appreciable cost of standard multiroll plastic calenders, the conventional calendering process still has several major limitations. First, the maximum thickness of sheeting which can be calendered without porosity and/or surface air streaks is usually about 25 mils, depending somewhat on the rheological properties of the material. Second, the maximum calendering rate is limited by the thermal stability and viscosity of the polymeric compound; this is a very serious limitation in the processing rates of many unplasticized polyvinyl chloride compounds. Third, very few polymers other than polyvinyl chloride have the roll release and rheological properties necessary for the complicated film tracking required on a four-roll calender. These and similar problems have to a large extent prevented the calendering process from reaching its potential as a broadly useful process for producing high-quality polymeric film and sheeting having excellent thickness uniformity and superior surface properties.

Reference is made to the accompanying drawings, wherein:

FIG. 1 shows schematically an idealized bank streamline flow pattern for isothermal calendering of a Newtonian fluid;

FIG. 2 shows schematically the corresponding velocity vectors in such fluid within the nip of the calender;

FIG. 5 is a schematic elevational sectional view of apparatus embodying the invention and capable of the calendering of polymeric material directly fed from an extruder;

FIG. 6 is a partial schematic plan view of the apparatus of FIG. 5;

FIG. 7 is a partial schematic sectional view of modified apparatus; and

It has been found that it is possible to overcome the calendering problems mentioned hereinabove by a radical change in the flow pattern of the natural calendering or milling bank. However, in order to appreciate the significance of this change, it is necessary first to consider the nature of the flow pattern in a conventional calendering bank and how the major problems encountered in current calendering processes arise from this pattern.

Referring specifically to FIG. 1, the streamline marked $\psi=0$ comprises the so-called stagnation line or surface. It separates the progressive or active flow zone from a stagnant flow zone which consists of two vortices with opposite directions of rotary flow. The fluid within the stagnant zone undergoes vortex flow and has extremely long residence times compared to fluid within the progressive flow zone. A comparison with the diagrams of the fluid velocity vectors of FIG. 2 shows that the stagnation line represents the line or surface where the volume of back flow (due to the hydrostatic pressure generated in the fluid) exactly equals the volume of forward flow (due to viscous drag from the moving roll surfaces). The apex of a stagnation line is commonly referred to as a stagnation point, referred to as $x=-x_*$ in FIG. 1. It can be shown that the stagnation point approaches the roll nip ($x=0$) and the stagnation surface approaches the roll surfaces as the roll nip opening is decreased. Also, if the peripheral roll speeds are unequal, the stagnation surface will recede from the fast roll and approach the slow roll. Furthermore, the hydrostatic pressure in the bank, which is very appreciable when calendering highly viscous polymers in thin gauges, has its maximum value at $x=-x_e$, i.e., within the progressive flow zone at a point symmetrical to the film egress point ($x=-x_e$).

Figure 3:
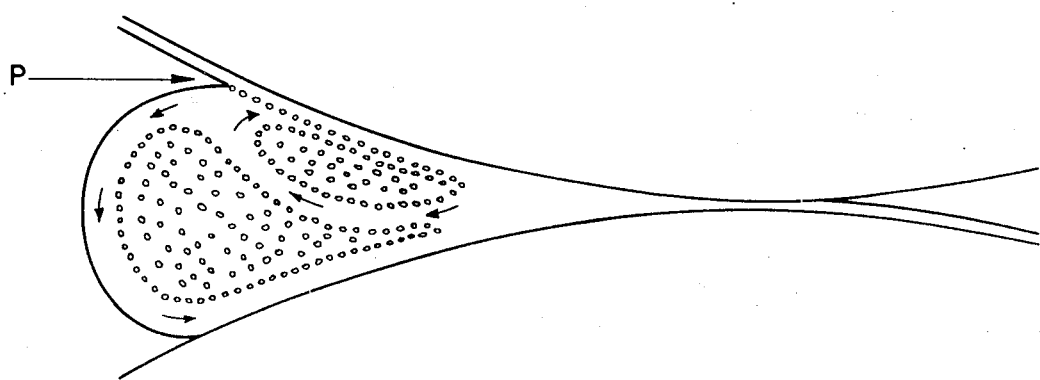
FIGS. 3 and 4 show typical fluid flow patterns drawn from photographs of banks of polymeric materials during calendering.
Figure 4:
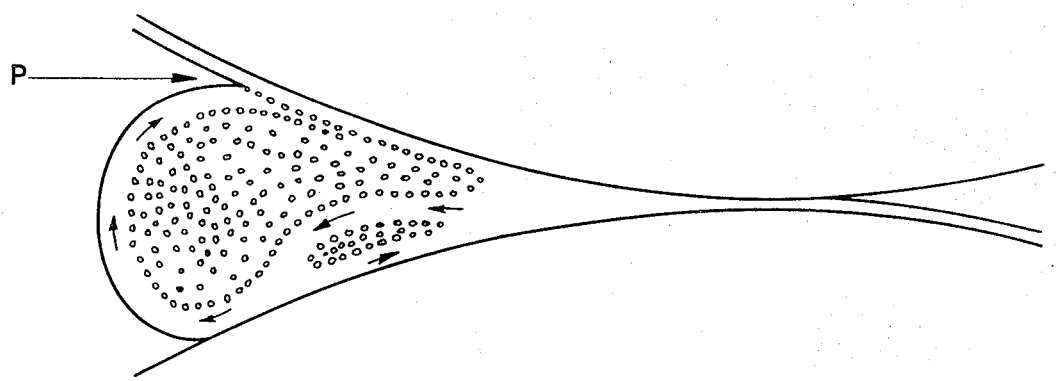

FIGS. 3 and 4 show two typical real flow patterns drawn from photographs taken of actual calendering banks of rigid polyvinyl chloride compounds. The similarity with the theoretical flow pattern in FIG. 1 is apparent, but the two vortices are far from symmetrical. The rotation of the outer bank surface is determined by the particular vortex which happens to predominate. The flow pattern show in FIG. 3 is most typical for conventional calendering operations, but the opposite bank rotation shown in FIG. 4 is occasionally encountered in practice.

The basic problems of the conventional calendering process have been traced experimentally to the flow pattern of the actual calendering bank shown in FIGS. 3 and 4.

First, the maximum thickness limitation of about 25 mils for most calendered sheeting is due to the peculiar air entrapment and rejection behavior of a natural calendering bank. We have found that air bubbles almost invariably are introduced into the calendering bank where the hot sheet moves into the bank (points P on FIGS. 3 and 4), no matter in which direction the bank is rotating. If the bank surface is fluid and glossy, this tendency is generally less than when the bank surface is dry and matte, but some air is nearly always introduced. If the bank is cold and "folding," additional air is often introduced due to air cavities between the folds and due to formation of secondary vortices. Nevertheless, as long as the nip opening is small, the stagnation surface is very close to the roll surface, air becomes trapped within the stagnant flow zone and has no opportunity to pass thru the roll nip. Accordingly, it is often seen in calendering of thin films that the calendering bank is filled with air bubbles, yet the emerging film is completely free of air. However, as the nip opening is increased in order to produce thicker sheeting, this fortunate situation no longer exists. The stagnation surface will recede from the roll surfaces and the roll nip, the air bubbles introduced at point P now will be captured within the progressive or active flow zone and the emerging sheet will become porous and/or contain air streaks on the surface and be commercially useless.

Second, the problem of polymer decomposition encountered in attempting to calender thermally unstable, yet highly viscous, materials is also intimately connected with the natural flow pattern of a normal calendering bank. As the roll speeds increase, the residence time of molten polymer in the progressive zone of the bank decreases; however, the residence time of the polymer melt within the stagnant zone remains very great. Actually, because of the increase in viscous heat dissipation with increasing roll speed, the polymer within this zone may degrade severely before any visible degradation occurs in the emerging sheet. Thus, the stagnant flow zone with its associated extreme residence times is the major rate-limiting factor of the calendering process.

The third major problem of the conventional calendering process is the difficulty with which many polymer melts comply with the complicated film tracking and roll release required on a four-roll calender. The fact that three-roll passes are required to produce a calendered sheet of acceptable surface quality is, of course, the underlying reason for this limitation since tracking on a two-roll calender generally is quite simple. In studying the calender bank flow of many polymeric materials, it has been consistently surprising how seemingly minor flow disturbances on the inlet side of a roll nip often cause very objectionable surface defects in the sheet emerging from the roll nip. This phenomenon, which undoubtedly stems from the elastic memory typical of high polymer melts, is believed to be responsible for the redundancy required in conventional calendering. In other words, the flow history, melt temperature, etc. within a calendering bank is not sufficiently uniform to obtain a high quality sheet unless the process is repeated at least once, usually twice or sometimes even three times over.

It is, accordingly, the prime object of the present invention to provide method and apparatus for the calendering of polymeric materials in which material thickness, degradation and surface defect limitations are greatly minimized or eliminated.

Other objects and advantages of the present invention will be apparent from the following description and appended claims.

In accordance with the present invention, method and apparatus are provided for the calendering of polymeric materials wherein said materials are fed thru the nip opening of a pair of counter-rotating calender rolls while maintaining a volumetric obstruction across the width and between said pair of calender rolls, with the most downstream projection of said obstruction being positioned so as to at least penetrate the bank of material formed between the pair of calender rolls upstream of the nip by the selection of calendering conditions, and while concurrently feeding a stream of polymeric material to said nip opening on each side of said volumetric obstruction.

The present invention provides a simple and effective solution to the above-mentioned and other problems inherent in the calendering process. The solution to this problem is effected by removing a substantial part of the stagnant flow zone by placing within this region of flow a volumetric obstruction, while at the same time introducing the polymeric fluid in the form of separate streams conforming to the active or progressive flow zone, i.e., one stream on each side of the obstruction. The flow obstruction substantially reduces the natural back flow in the calendering bank and thus makes it possible to reduce or eliminate the usual bank rotation with its associated problems of air entrapment, thermal degradation, sensitivity to surface defects, etc. In fact, the present invention makes it possible to calender film and sheeting of excellent surface quality on a two-roll calender or mill by direct feeding from an extruder using a suitably designed die. Also, the invention makes it possible to calender much heavier gauge sheeting of a variety of polymers on conventional calenders or mills by the use of a suitably arranged obstruction.

The invention is more fully explained by reference to the apparatus embodiment shown in FIGS. 5 and 6. As there shown, calender 10 is provided comprising a pair of counter-rotating rolls 12 and 14 and stripper roll 16. Calender 10 is directly fed two molten polymer streams 18 and 20 from extrusion die 22, which comprises die housing 24 and flow divider 26. A stream of molten polymeric material 28 is forced from conventional extruder means (not shown) and enters extrusion die 22 thru inlet means 30. The polymeric material then passes thru passage 32 to internal die manifold 34, having two manifold branches 34a and 34b.

Along the manifold edge, the molten polymeric material stream is separated into two streams by flow divider 26 which, in its most forward projection 36, also serves as solid volumetric obstruction. Because the forward projection of the flow divider (volumetric obstruction) preferably occupies a substantial portion of the back-flow region (stagnant flow zone), smooth, gently curved bank surfaces 18a and 20a are formed between the die lips and the roll surfaces, as shown in FIG. 7 of the drawings.

It has been found that the forward projection of the flow divider (volumetric obstruction) does not have to conform closely to the particular stagnation surface resulting from a particular roll diameter and nip opening. Actually, it is preferable that the front end of the flow divider is considerably more blunt than the theoretical stagnation surface and that it stops somewhat short of the stagnation point. The reason for this is that the hydrostatic pressure in the roll nip is low in the outer region of the bank, whereas it increases steeply near the maximum pressure point (FIG. 1, $x=-x_e$). Consequently, if the front end of the flow divider (volumetric obsrtuction) protrudes only moderately into the bank, some misalignment of the die can be tolerated.

Furthermore, a blunt front end is more tolerant of operation with variable relative roll speeds which, as previously mentioned, changes the shape of the stagnation surface and thus the optimum position of the volumetric obstruction. On the other hand, if the front end of the flow divider is sharp and protrudes far into the roll nip, then the alignment of the die, i.e., volumetric obstruction, must be very accurate in order to avoid undesirable deflections and flow disturbances.

It should also be pointed out that the use of a blunt flow obstruction which stops far short of the apex of the stagnation surface does not eliminate vortex flow per se. It has been found, experimentally, that, as is shown in FIG. 7 of the drawings, a flow region containing two rotating vortices 40 sometimes exists in front of a blunt volumetric obstruction. Nevertheless, in contrast to the conventional calendering bank (FIGS. 3 and 4), these small vortices are submerged well within the fluid stream and occupy a volume which is only a small fraction of the stagnant flow volume in a corresponding natural calendering bank. Accordingly it has been found that small internal vortices of this type do not cause any of the problems previously related to the large stagnant flow zone in a conventional calendering bank.

It is, of course, to be understood that volumetric obstruction 36 is maintained across the full width of and between calender rolls 12 and 14. It has been found that the most forward (downstream in the direction of material passage) projection of the obstruction should be positioned so as to at least penetrate the bank of material formed between the pair of calender rolls upstream of the nip by the selection of calendering conditions.

It has been found preferable that the most forward projection of the volumetric obstruction be positioned well within the space between the pair of calender rolls beyond the position of merely slight penetration of the bank of material being calendered. However, any positioning of the most forward projection of the volumetric obstruction (within such penetration of the bank) between the rolls will provide a significant reduction in back flow and consequently improved calendering results.

It is most preferred that calendering operations be performed with the obstruction maintained at a sufficiently close distance to the nip to substantially reduce the calender back flow and thus eliminate the natural bank rotation typical of conventional calendering banks. This has been found capable of accomplishment by substantially contouring and positioning the volumetric obstruction with the stagnation zone or area as defined in FIGS. 1 and 2. However, as pointed out hereinabove, this contouring and positioning is by no means critical and the desired results are progressively accomplished as a more substantial portion of the back-flow zone becomes occupied by the volumetric obstruction.

Figure 8:
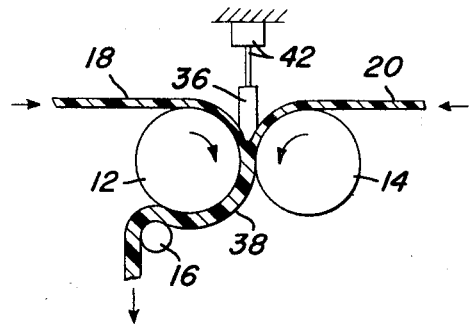
FIGS. 8, 9 and 10 are schematic sectional views of further modified calendering apparatus embodying the invention.

An alternate embodiment of apparatus embodying the invention is shown in FIG. 8. As there shown, two molten polymer streams 18 and 20 are introduced into a roll nip along the surfaces of two counter-rotating rolls 12 and 14 and normal bank build-up and rotation in the nip prevented by volumetric obstruction 36 which is maintained in the roll nip by hydraulic, pneumatic or mechanical means 42. The volumetric obstruction 36 is hydrodynamically balanced in a sideward direction by the two fluid streams, and deflections within the plane formed by the volumetric obstruction means and the roll nip can be easily reduced to a desired level by using obstruction means having sufficient stiffness in this plane or by hydraulically, pneumatically or mechanically backloading the obstruction means. Accordingly, the obstruction means automatically seeks its optimum position for the prevention of back flow by the hydrodynamic forces acting in the roll nip.

The two polymer streams introduced on either side of the obstruction means may originate from any suitable source, such as sheet extruders, calenders or the like. FIG. 8 illustrates an embodiment suitable for any such arrangement. Specifically, the fluid streams may also be generated by calendering operations on the same conventional calender, as illustrated in the inverted L or Z calenders of FIGS. 9 and 10. The threading arrangements illustrated in FIGS. 9 and 10 may seem rather cumbersome; however, far more complicated approaches have heretofore been suggested in order to achieve similar improvements in the calendering process, i.e., triple and quadruple mills. Actually, the main advantage of threading systems, such as those illustrated in FIGS. 9 and 10, is that they make it possible to practice the present invention by merely modifying already existing equipment.

Figure 9:
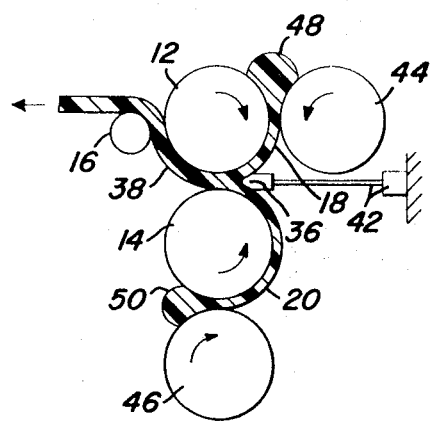

As specifically shown in the inverted L calender embodiment of FIG. 9, the pair of calendering rolls 12 and 14 cooperate to perform the calendering operation of the present invention. Rolls 44 and 46 are employed, as shown, to provide the two streams of polymeric material 18 and 20. These streams are produced by feeding molten polymeric material to the material banks 48 and 50, formed between the two conventionally-operating calender paired rolls 12–44 and 14–46, respectively.

Figure 10:
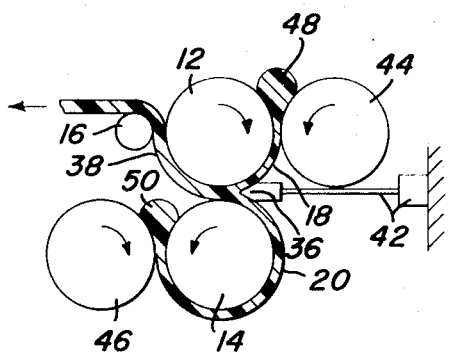

As specifically shown in the Z calender embodiment of FIG. 10, the pair of calendering rolls 12 and 14 similarly cooperate to perform the calendering operation in accordance with the present invention. Other elements of this embodiment perform functions of similarly-numbered elements of the embodiment of FIG. 9.

In order to avoid confusion and more fully understand the significance of the direct extruder-fed calendering aspect of the present invention, the differences between such a process and the conventional roll planishing or embossing process should be set forth.

Calendering is the process of forming a molten polymeric material into film or sheet by passing it between one or more pairs of counter-rotating rolls, i.e., in calendering, the fluid is greatly compressed in the thickness direction by passing thru the roll nip. In other words, the ratio of the bank "diameter" (shortest distance between the points where the fluid touches both rolls on the ingress side) to the sheet thickness (shortest distance between the points where the fluid touches both rolls on the egress side) is considerably larger than unity, in fact, usually ten to a thousand fold.

In contrast, embossing or roll planishing is the process of imparting a desired surface to an already-shaped sheet with substantially no thickness reduction by passing it between one or more pairs of counter-rotating rolls. Accordingly, the compression in the roll nip is so slight that only a very slight bulging in the sheet is allowed to form in front of the roll nip and the ingress-to-egress thickness ratio is very close to unity. In conventional sheet extrusion, the plastic is formed into final thickness by extrusion thru a die and the hot sheet is then cooled and roll planished or embossed by slight compression between cooling rolls. Excellent illustrations and descriptions of the conventional sheet extrusion process are given in chapter 4 of A. L. Griff: "Plastics Extrusion Technology," New York (Reinhold Book Corporation) 1968.

The advantages of forming the final film or sheet between rolls (as in the present invention), rather than in a film or sheeting die (as in extrusion-embossing) are considerable:

First, the output of a single screw extruder increases markedly with channel depth and screw speed. However, if the attached die has considerable flow resistance, such as is the case if the ultimate web thickness is achieved in the die, then the output of the extruder is severely limited due to overheating caused by excessive generation of viscous heat in the extruder. In contrast, dies for feeding thick molten webs for subsequent calendering can be designed with very low flow resistance resulting in vastly greater overall production rates.

Second, due to elastic memory effects, the surface of a thermoplastic sheet after reheating usually reverts to the appearance it received at the highest temperature during its forming operation. For example, an extruded/planished sheet may have received an excellent surface in the planishing operation, yet if reheated, say for subsequent vacuum forming, it may revert to the original extruded surface having die streaks, non-uniformities, etc. In contract, the calender rolls impart the final surface at the highest forming temperature encountered, thereby resulting in a thermally superior surface.

Third, in case of subsequent in-line orientation of a plastic web, it is usually desired to form the web at as low a temperature as possible. This is especially important in cases of thick sheeting where it is difficult to achieve a uniform temperature profile across the thickness of the sheet by subsequent external cooling. It has been found that it is possible to extrude and calender a sheet with excellent surface properties at melt temperatures much closer to the optimum orientation temperature than is possible by the standard extrusion method employed in extrusion-embossing. This has proven to be a significant advantage for in-line orientation of sheeting, especially in thick gauges.

The following basic equipment units were used in various combinations in the examples listed below:

|  | Extruders | |
| --- | --- | --- |
|  | #1 | #2 |
| Barrel diameter | 3½ inches | 6 inches. |
| L/D ratio | 21 | 24. |
| Screw helix | Square pitch | Square pitch. |
| Channel depth: | | |
| A-screw | 0.125 inch | 0.300 inch. |
| B-screw | 0.200 inch | |
| Compression ratio: | | |
| A-screw | 4.5 | 3.7. |
| B-screw | 2.8 | |

|  | Calenders | |
| --- | --- | --- |
|  | #1 | #2 |
| Type | 2-roll vertical | 4-roll inverted "L". |
| Roll drives | Individual | Common, equal roll speeds. |
| Roll heating | do | Individual. |
| Roll diameter | 12 inches | 8 inches. |
| Roll face | 24 inches | 16 inches. |

The polymeric compounds used in the examples were characterized in terms of the power law expression for the viscosity of non-Newtonian fluids:

$$\mu = \mu_0 \left(\frac{\gamma}{\gamma_0}\right)^n = c_0 \cdot \gamma^n$$

where:

$\mu$ = apparent melt viscosity (lbs.·sec.·in.$^{-2}$)

$\gamma$ = shear rate (sec.$^{-1}$)

$c_0$ = extrapolated viscosity at unit shear rate ($\gamma = 1$)

$n$ = power law exponent

EXAMPLE 1

This example illustrates the versatility of the split-stream calendering method for producing sheeting in an extreme range of thicknesses without surface defects or air entrapment. The equipment arrangement was that of FIGS. 5–6, i.e., a two-roll calender fed directly from an extruder using a split-stream die. The polymeric material was rigid (unplasticized) polyvinyl chloride.

A granulated PVC compound having a unit shear rate viscosity ($c_0$) equal to 2.5 and a power law exponent ($n$) equal to −0.42 at 180° C. was fed to extruder #1 equipped with extruder screw B. Attached to the discharge end of the extruder thru a flexible adapter was a split-stream die as illustrated in FIGS. 5–6. The discharge orifice of the die was 1 x 18 in. Protruding thru the die orifice was a 0.6 x 18 in. flow divider leaving two net die orifices of 0.2 x 18 in. symmetrically disposed on either side of the flow divider. The front end of the flow divider had a semi-circular shape as shown in FIG. 7 which protruded 1¼ in. beyond the die lips. The extruder/die combination was operated at the following conditions:

Extruder barrel zones, rear-to-front: 160° C./145° C./150° C.
Melt temperature at die: 180° C.
Melt pressure at die: 1000 p.s.i.
Die temperature (oil heat): 165° C.
Screw speed: 22 r.p.m.
Throughput rate: 210 lbs./hr.

After stable operating conditions had been achieved, the extruder/die combination unit was moved into the roll nip of calender #1 using a mechanical die linkage support (not shown) to assure that the die orifice remained aligned with the roll nip independently of the nip opening. Using an initial nip opening of 0.205 in. corresponding to a calendered sheet thickness of about 0.250 in., the calender rolls were adjusted to the following conditions to accommodate the output of the extruder:

Temperature, top roll: 155° C.
Temperature, bottom roll: 165° C.
Roll speed, top roll: 1.15 f.p.m.
Roll speed, bottom roll: 1.25 f.p.m.

The die equipped with the flow obstruction described above was now forced into the roll nip by a mechanical screw-down attachment between the die and the calender frame until a smooth flow pattern as shown in FIG. 7 was achieved across the width of the die. The hot sheeting emerging from the roll nip was completely free of air entrapment, of high gloss and free of any surface imperfections.

The roll nip opening was now gradually decreased and the calender roll speeds commensurately increased to match the constant output of the extruder. It was noted that the emerging sheet thickness could be reduced at least to half of the original value without disturbing the smooth flow pattern between the die lips and the calender rolls.

As the sheet thickness decreased further, it became necessary to force the die slightly closer to the roll nip in order to secure the intended flow pattern. When this was done, however, excellent flow uniformity and sheet quality was obtained continuously up until the maximum roll speed of the calender of about 60 f.p.m. corresponding to a final film thickness of about 5 mils.

In similar experiments, the calender was supplied with a single stream of the same compound from a conventional slot die without any volumetric obstruction for control of back flow in the roll nip. In these cases, conventional rotating bank flow occurred and unavoidable flow irregularities in the bank resulted in severe defects in the emerging sheet. Also, at sheet thicknesses above 30 mils, air entrapment occured to increasing extents with increasing thickness in agreement with the general experience with the conventional calendering process.

These results show clearly the superiority of the dual-stream calendering method as compared to conventional calendering with rotating banks. The split-stream method of feeding a calender enables not only production of high-quality sheeting in a single roll pass rather than three roll passes, but it even allows production of air-free sheeting in much heavier gauges than is now possible on conventional calenders.

EXAMPLE 2

This example illustrates the ability of the split-stream calendering method for producing sheeting at high rates without surface defects or air entrapment. The equipment arrangement was the same as that of Example 1, except that a larger extruder was used. Also, the polymeric material was high-density polyethylene.

A granulated compound of pigmented, high-density polyethylene having a unit shear rate viscosity ($c_0$) equal to 5.4 and a power law exponent ($n$) equal to −0.66 at 185° C. was fed to extruder #2. The split-stream die described in Example 1 was attached to the extruder thru a flexible, valved adapter and the extruder/die combination was operated at the following conditions:

Extruder barrel zones, rear-to-front: 150° C./160° C./ 170° C./175° C.
Melt temperature at die: 191° C.
Melt pressure at die: 2,000 p.s.i.
Die temperature (oil heat): 185° C.
Screw speed: 30 r.p.m.
Valve section: Slightly closed.
Throughput rate: 915 lbs./hr.

Using the same procedure as described in Example 1, the extruder die w./volumetric flow obstruction was moved into the roll nip. A nip opennig of 0.040 in. corresponding to a calendered sheet thickness of about 0.050 in. was used and the calender was adjusted to the following conditions to accommodate the output of the extruder:

Temperature, top roll: 130° C.
Temperature, bottom roll: 135° C.
Roll speed, top roll: 31 f.p.m.
Roll speed, bottom roll: 32 f.p.m.

Keeping the extruder output constant, the roll nip opening was then first doubled and later reduced to half of the original value making commensurate changes in the roll speeds. Without changing the die position relative to the calender, sheeting with excellent surface quality and complete freedom from entrapped air was produced.

This experiment illustrates what may be the greatest advantage of the split-stream calendering system, namely, the ability to produce calendered film and sheeting of excellent quality and high rate and yet with very low extruder back pressure. If fluxed compound is fed to the extruder rather than solid pellets, then no fluxing and mixing is required of the extruder and an inexpensive, short-barrel, deep-channel strainer-extruder can be used to feed a low-pressure, split-stream die. In contrast, deep-channel extruders are impractical in normal high-pressure extrusion because the output of such extruders decreases sharply with the flow resistance of the die, thus negating the advantage. However, in this system, the major work connected with shaping the melt into sheeting is done by the calender rolls and a split-stream die can, therefore, be designed with very low flow resistance.

EXAMPLE 3

This example illustrates the capability of the split-stream calendering method in forming film and sheeting at much lower melt temperatures than those normally attainable by sheet extrusion. This is especially important for in-line orientation of heavy sheeting because the optimum melt temperature for orientation is considerably lower than the optimum melt temperature for sheet extrusion. The polymeric material used in this example was polystyrene.

A polystyrene homopolymer compound having a unit shear rate viscosity ($c_0$) equal to 5.8 and a power law exponent ($n$) equal to $-0.74$ at 160° C. was fed to extruder #1 equipped with extruder screw A. The split-stream die was attached as described in Example 1. The extruder/die combination was operated at the following conditions:

Extruder barrel zones, rear-to-front: 135° C./145° C./ 160° C.
Melt temperature at die: 155° C.
Melt pressure at die: 650 p.s.i.
Die temperature (oil heat): 150° C.
Screw speed: 15 r.p.m.
Throughput rate: 120 lbs./hr.

The extruder/die combination unit was then moved into the roll nip of calender #1 and the die w./volumetric flow obstruction positioned as described earlier. The roll nip opening was adjusted to 0.160 in. corresponding to a sheet thickness of about 0.200 in. The calender rolls were adjusted as follows:

Temperature, top roll: 100° C.
Temperature, bottom roll: 100° C.
Roll speed, top roll: 1 f.p.m.
Roll speed, bottom roll: 1 f.pm.

The sheet was completely air free and of excellent surface quality. The temperature of the sheet immediately as it emerged from the roll nip, i.e., without following either roll, was measured to be 135° C. This is very closely the optimum orientation temperature for polystyrene sheeting and much lower than the minimum melt temperature attainable in conventional sheet extrusion which is 175–180° C. if a good surface is required.

This example illustrates the ability of the split-stream calendering method to produce sheeting of excellent surface quality at much lower temperatures than those possible in ordinary sheet extrusion. As mentioned above, this is of particular commercial importance for in-line orientation of heavy sheeting.

EXAMPLE 4

This example illustrates the split-stream calendering system applied on a conventional four-roll calender in order to produce heavier gauge sheeting than normally possible by ordinary calendering. The polymeric material in this example was low-density polyethylene.

A low-density (0.918) polyethylene compound containing a red pigment was fluxed in a Banbury, transferred to a mill (roll temperatures—115–125° C.) and then fed to the top roll nip 48 on calender #2 as shown in FIG. 9. Another batch, containing a green pigment, was fed to the lower roll nip 50 and a volumetric flow obstruction 36 as shown in FIG. 9 was then hydraulically forced into the roll nip formed by rolls 12 and 14. The calendering conditions were as follows:

"Red" nip opening: 0.020"
"Green" nip opening: 0.020"
Split-stream nip opening: 0.040"
Rolls 44 and 46: 115° C.
Roll 14: 120° C.
Roll 12: 125° C.
Roll speed (all rolls): 10 f.p.m.

No bank rotation occurred in the dual-stream roll nip containing the volumetric obstruction and the sheeting stripped off roll 12 was air free and of good surface quality. The top side of the sheet was red and the bottom side green and very little pigment intermixing had occurred.

The volumetric flow obstruction was now removed and natural bank rotation allowed to occur. The sheet emerging on roll 12 now became porous and contained notable air streaks and surface roughness. Also, considerable pigment intermixing was evident due to the uncontrolled rotational flow in the last roll bank.

This example illustrates the use of the split-stream calendering principle for making heavier sheeting than normally possible on a standard calender. Also, the experiment shows the utility of this method for melt lamination of dissimilar polymers on a calender.

All of the above examples illustrate the versatility of the invention in calendering a wide range of polymers as compared to the very limited range which can be handled in conventional calendering.

What is claimed is:

1. In the calendering of molten, flowable polymeric materials selected from the group consisting of polyethylene, polyvinyl chloride and polystyrene, wherein said materials are fed through the nip opening of a pair of counter-rotating calender rolls, the improvement which comprises calendering while maintaining a volumetric obstruction across the width and between the pair of calender rolls, with the most downstream projection of said obstruction being positioned so as to at least penetrate the diameter of the bank of material formed between the pair of calender rolls upstream of the nip by the selection of calendering conditions, and while concurrently feeding said polymeric material to said nip opening on each side of said volumetric obstruction as separate streams conforming to the progressive flow zone of the roll pair.

2. In the calendering of molten, flowable polymeric materials, wherein said materials are fed thru the nip opening of a pair of counter-rotating calender rolls, the improvement which comprises calendering while maintaining a volumetric obstruction across the width and between the pair of calender rolls, with the most downstream projection of said obstruction being positioned so as to at least penetrate the diameter of the bank of material formed between the pair of calender rolls upstream of the nip by the selection of calendering conditions, and while concurrently feeding said polymeric material to said nip opening on each side of said volumetric obstruction as separate streams conforming to the progressive flow zone of the roll pair.

3. Process in accordance with claim 2, wherein said volumetric obstruction is symmetrically shaped and positioned across the width of said pair of calender rolls.

4. Process in accordance with claim 2, wherein said volumetric obstruction is of decreasing cross-sectional thickness in the downstream direction of feed of said polymeric material.

5. The continuous process for the calendering of molten, flowable polymeric materials comprising forming two separate, continuous streams of polymeric material, providing a calender having a pair of counter-rotating rolls and a volumetric obstruction across the width and between the pair of calender rolls, with the most downstream projection of said obstruction being positioned so as to at least penetrate the diameter of the bank of material formed between the pair of calender rolls upstream of the nip by the selection of calendering conditions, and feeding said polymeric material to said calender rolls on opposite sides of said volumetric obstruction as two separate streams conforming to the progressive flow zone of the roll pair.

6. Process in accordance with claim 5, wherein said volumetric obstruction is symmetrically shaped and positioned across the width of said pair of calender rolls.

7. Process in accordance with claim 5, wherein said volumetric obstruction is of decreasing cross-sectional thickness in the downstream direction of feed of said polymeric material.

8. The continuous process for the direct extrusion-calendering of molten, flowable polymeric materials comprising forming two separate, continuous, extruded streams of polymeric material providing a calender having a pair of counter-rotating rolls and a volumetric obstruction across the width and between the pair of calender rolls, with the most downstream projection of said obstruction being positioned so as to at least penetrate the diameter of the bank of material formed between the pair of calender rolls upstream of the nip by the selection of calendering conditions, and feeding said two separate extruded streams of polymeric material to said calender rolls on opposite sides of said volumetric obstruction, said streams conforming to the progressive flow zone of the roll pair.

9. Process in accordance with claim 8 wherein said volumetric obstruction is symmetrically shaped and positioned across the width of said pair of calender rolls.

10. Process in accordance with claim 8, wherein said volumetric obstruction is of decreasing cross-sectional thickness in the downstream direction of feed of said polymeric material.

References Cited
UNITED STATES PATENTS

| Number | Date | Name | Class |
|---|---|---|---|
| 894,790 | 7/1908 | Ackerman | 18—11 |
| 1,277,729 | 7/1917 | Kearns | 18—9 |
| 1,296,114 | 3/1919 | Perry | 264—175 |
| 1,603,812 | 10/1926 | Stein | 18—11 |
| 1,603,813 | 10/1926 | Stein | 264—175 |
| 1,664,273 | 3/1928 | Theroux | 18—10 |
| 2,075,735 | 3/1937 | Loomis | 264—175 |
| 2,249,507 | 7/1941 | Derhoff | 18—15 F |
| 2,382,177 | 8/1945 | Schanz | 264—175 |
| 2,515,243 | 7/1950 | Lyon | 264—175 |
| 2,760,229 | 8/1956 | Cheney et al. | 18—9 |
| 3,499,957 | 3/1970 | Ancker | 264—175 |
| 2,434,707 | 1/1948 | Marshall | 264—349 |
| 2,625,709 | 1/1953 | Schairer | 264—349 |
| 2,629,129 | 2/1953 | Hanson et al. | 264—349 |
| 2,632,203 | 3/1953 | Lanbarede | 264—349 |
| 2,763,896 | 9/1956 | Vogt | 264—349 |
| 3,415,912 | 12/1968 | Bohin | 264—175 |
| 3,543,333 | 12/1970 | Anders et al. | 264—175 |

FOREIGN PATENTS

| Number | Date | Country | Class |
|---|---|---|---|
| 172,192 | 8/1952 | Austria | 18—10 |
| 48,676 | 4/1966 | Germany | 264—175 |

JAY H. WOO, Primary Examiner

U.S. Cl. X.R.

18—9, 12 TF; 264—176